No. 785,910. PATENTED MAR. 28, 1905.
K. P. NILSSON.
CENTRIFUGAL MACHINE.
APPLICATION FILED MAR. 19, 1903.
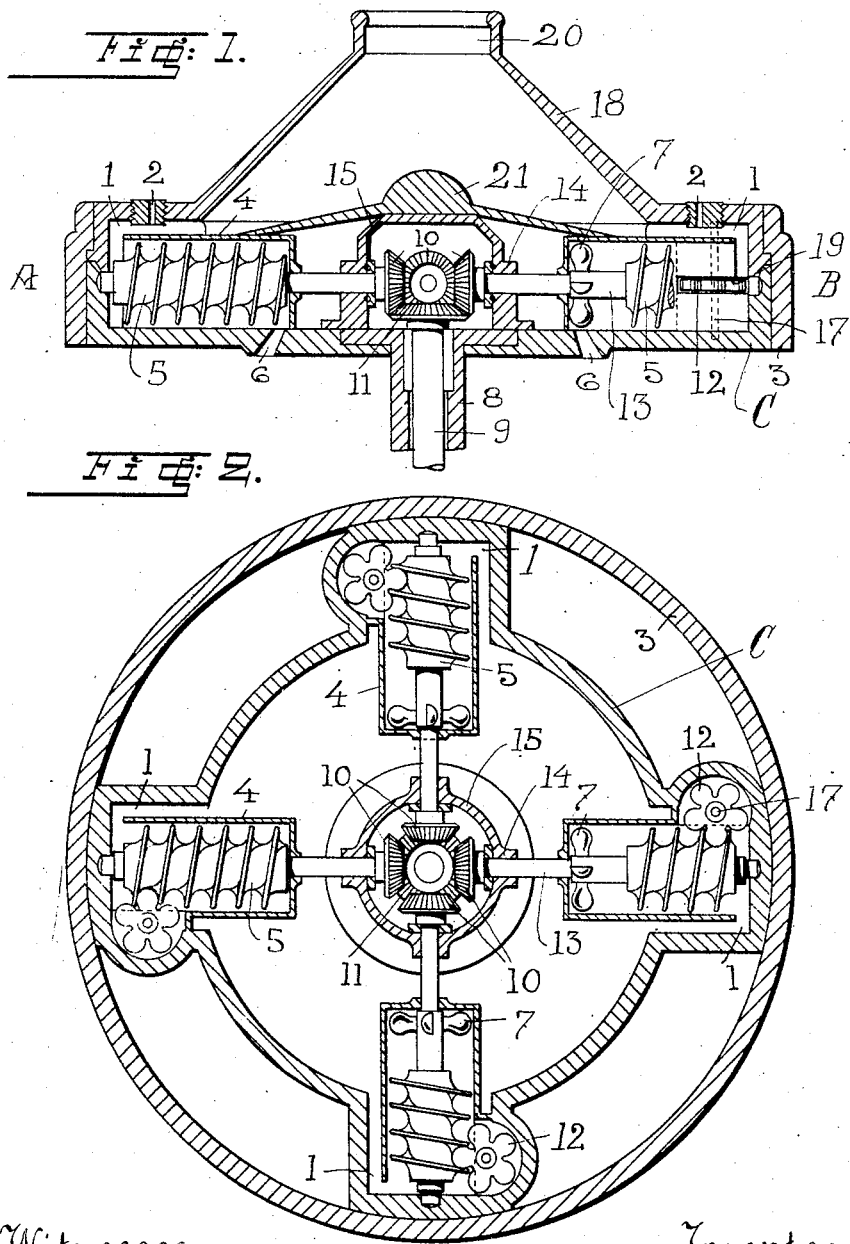
Witnesses:
Evald Delmar
Gerda Lindkvist
Inventor:
Karl P. Nilsson
by Oxydahl
his att'y No. 785,910.  
Patented March 28, 1905.

UNITED STATES PATENT OFFICE.

KARL PETTER NILSSON, OF STOCKHOLM, SWEDEN.

CENTRIFUGAL MACHINE.

SPECIFICATION forming part of Letters Patent No. 785,910, dated March 28, 1905.

Application filed March 19, 1903. Serial No. 148,537.

*To all whom it may concern:*

Be it known that I, KARL PETTER NILSSON, a subject of the King of Sweden and Norway, and a resident of Stockholm, Sweden, have invented new and useful Improvements in Centrifugal Separators, of which the following is a specification, reference being had to the drawings accompanying and forming a part hereof.

This invention relates to improvements in centrifugal separators for separating matters suspended in liquids, and relates particularly to such separators as may be employed in separating such matters as utricles of yeast from the water with which they are mixed or kaolin (porcelain-clay) from the water in which it has been washed or the like separators. In such separators the discharge of the suspended matters or the heavier particles has been effected by means of discharge-channels of special shapes in order to obviate the sticking of the said particles in the discharge-channels. The result of such devices has, however, not been successful.

The object of my present invention is, therefore, to provide a centrifugal separator of the kind referred to in which the suspended matters will be mechanically forced toward the discharge-openings, whereby the possibility of the said matters to pack and stick in the discharge channels or openings will be reduced to a minimum.

The invention consists chiefly in this, that the bowl is provided with one or more rotating screws or the like located in corresponding channels, casings, or the like inside the bowl and means for rotating said screws or the like, so as to continuously force the heavier particles inward to the discharge-openings, which are arranged at shorter radial distance from the shaft of the bowl than the outlets for the separated liquid.

The invention also consists in the combinations and arrangements of parts hereinafter described and claimed.

In the accompanying drawings I have shown a suitable way of carrying out my invention.

Figure 1 shows a vertical section of a bowl constructed in accordance with my present invention. Fig. 2 shows a section on line A B in Fig. 1.

In the constructional form shown in the drawings the bowl C is provided with radially-projecting chambers 1, having outlets 2 for the separated liquid, the said outlets being preferably arranged at such radial distance from the shaft of the bowl C that the wall of liquid will during the separation be inside the said chambers 1, whereby the matters suspended in the liquid will accumulate only in the same. The bowl may preferably be surrounded by a ring 3 in order to reduce the air resistance otherwise caused by the said projecting chambers. In the bowl C is further provided a number of casings 4, one in each chamber 1, the said casings being open at their outer ends, so that the suspended matters can enter the same. Within the said casings are provided one or more screws 5, the shafts 13 of which may be journaled at one end in the wall of the drum and at the other end in bearings 14, formed in a central casing 15. The said screws may be driven by any suitable means, such as bevel-wheels 10, attached to the inner ends of their shafts 13 and engaging a bevel-wheel 11, fixed on a vertical shaft 9, arranged in the shaft 8 of the bowl. The said shaft 9 may either be connected to a suitable driving device (not shown) or it may be made fixed, in which case the screws 5 will be rotated thereby, because the bevel-wheels 10 roll on the bevel-wheel 11. The screw-threads of the screws 5 may either extend through the whole length of the casings 4, as illustrated at the left side in Fig. 1, or they may be arranged only at the outer parts of the said casings, as shown at the right side of the same figure. In the latter case the shafts 13 may preferably be provided at the inner ends of the casings 4 with wings 7 or the like in order to prevent the slime from sticking or packing in the outlet or discharge openings 6. At the outer ends of the casings 4 one or more toothed disks 12, engaging the screws 5, may be provided for the purpose of preventing the slime or heavy matter caught by the screws from partaking in the rotation of the same, and thus preventing the slime from packing in the screw-threads or in the casings 4. The said toothed disks 12 may preferably be fixed to vertical pins 17, journaled in the bottom and the cover 18 of the bowl C, as illustrated in Fig. 1, the casings 4 being at one side provided with a horizontal slot 19, through which the said disks are inserted, so as to engage the screws 5.

The working of the above-described centrifugal separator is as follows: The liquid to be separated is continually let into the bowl in any suitable manner through the central opening 20 of the cover 18 and falls down onto a spreading-disk 21, from which it is thrown outward by the centrifugal force and fills up the chambers 1 in line with the outlet-openings 2, through which the separated liquid will continually flow out, while the suspended matters gradually accumulate in the outer parts of the chambers until they are caught by the screws 5, which will then force the slime inward to the outlet-openings 6, through which it will be continually discharged, the casings 4 serving to prevent the heavy matter from moving any other way than toward the discharge-openings.

Obviously any number of screws may be used in one and the same bowl, and it will be understood that the screws need not be arranged horizontally and radially, as illustrated in the drawings, but they may be arranged obliquely in relation to a radius or inclined in relation to a horizontal plane, or both, provided only that they are arranged in such manner as to force the slime against the discharge-openings for the same. Eventually the screws may also be arranged axially and the casings surrounding the same connected to radially or in other manner arranged channels leading to the slime-outlets.

The casings 4 in the constructional form shown in the drawings may be dispensed with if the discharge-openings be arranged within or at the inner ends of the chambers 1, the screws being thereby preferably made of somewhat larger diameter than illustrated in the drawings.

Having now particularly described my invention and in what manner the same may be performed, what I claim as new, and desire to secure by Letters Patent, is—

1. In a centrifugal separator the combination of a bowl provided with an inlet for the liquid to be separated and with outlet-openings for the separated liquid and with discharge-openings for the slime at shorter radial distance from the shaft of the bowl than the said outlet-openings for the liquid to be separated, screws inside the said bowl, means for rotating the said screws in such direction that the same will force the slime toward the center of the bowl, and means for inclosing the said screws, substantially as and for the purpose set forth.

2. In a centrifugal separator the combination of a bowl provided with an inlet for the liquid to be separated, and with outlet-openings for the separated liquid, and with discharge-openings for the slime at shorter radial distance from the shaft of the bowl than the said outlet-openings for the liquid to be separated, screws, means for rotating the said screws, means for inclosing the latter, and toothed disks engaging the same, substantially as and for the purpose set forth.

3. In a centrifugal separator the combination of a bowl provided with an inlet for the liquid to be separated, and with outlet-openings for the separated liquid, and with discharge-openings for the slime at shorter radial distance from the shaft of the bowl than the said outlet-openings for the liquid to be separated, chambers projecting radially from the bowl, screws in said chambers, and means for rotating the said screws, substantially as and for the purpose set forth.

4. In a centrifugal separator the combination of a bowl provided with an inlet for the liquid to be separated, and with outlet-openings for the separated liquid, and with discharge-openings for the slime at shorter radial distance from the shaft of the bowl than the said outlet-openings for the liquid to be separated, chambers projecting radially from the bowl, casings in the said chambers, screws within the said casings, and means for rotating the said screws, substantially as and for the purpose set forth.

5. In a centrifugal separator the combination of a bowl provided with an inlet for the liquid to be separated, and with outlet-openings for the separated liquid, and with discharge-openings for the slime at shorter radial distance from the shaft of the bowl than the said outlet-openings for the liquid to be separated, chambers projecting radially from the bowl, screws in the said chambers, means for rotating the said screws, and toothed disks engaging the same, substantially as and for the purpose set forth.

6. In a centrifugal separator the combination of a bowl provided with an inlet for the liquid to be separated, and with outlet-openings for the separated liquid, and with discharge-openings for the slime at shorter radial distance from the shaft of the bowl than the said outlet-openings for the liquid to be separated, screws, means for rotating the said screws, wings on the shafts of said screws, and means for inclosing the latter and the said wings, substantially as and for the purpose set forth.

In testimony whereof I have signed my name to this specification in the presence of two subscribing witnesses.

KARL PETTER NILSSON.

Witnesses:
KARL RUNESKOG,
EVALD DELMAR.